United States Patent [19]

Knox

[11] 4,444,438

[45] Apr. 24, 1984

[54] POWER-MANUAL BRAKE SYSTEM

[75] Inventor: Kibourne H. Knox, Woodland Hills, Calif.

[73] Assignee: Tempco Engineering, Inc., Sun Valley, Calif.

[21] Appl. No.: 432,899

[22] PCT Filed: Jul. 19, 1982

[86] PCT No.: PCT/US82/00972

§ 371 Date: Aug. 31, 1982

§ 102(e) Date: Aug. 31, 1982

[87] PCT Pub. No.: WO84/00333

PCT Pub. Date: Feb. 2, 1984

[51] Int. Cl.³ .............................................. B60T 8/02
[52] U.S. Cl. ...................................... 303/13; 303/10; 303/117

[58] Field of Search ....................... 303/2, 3, 6 R, 6 A, 303/6 M, 10-13, 15, 113-119, 68, 84 A, 91, 92, 48, 49, 40, 14; 244/111; 188/151 R, 151 A, 181 A, 181 R, 170, 345

[56] References Cited

U.S. PATENT DOCUMENTS

| | | | |
|---|---|---|---|
| 3,503,655 | 3/1970 | Heimler | 303/13 x |
| 3,661,427 | 5/1972 | Hodge | 303/10 X |
| 4,121,874 | 10/1978 | Knox et al. | 303/13 X |
| 4,251,115 | 2/1981 | Knox et al. | 303/117 X |

Primary Examiner—Douglas C. Butler
Attorney, Agent, or Firm—Harry R. Lubcke

[57] ABSTRACT

A vehicle brake system that is selectively power or manually operable. A novel isolation valve (2) isolates the manual part (4,5,8) of the system from the power part (10,18) when the latter is inoperative. This prevents the flow of manually manipulated fluid to the inactive power part of the system, with the consequent needless loss of fluid pressure and braking effort.

4 Claims, 3 Drawing Figures

POWER-MANUAL BRAKE SYSTEM

TECHNICAL FIELD

This invention pertains to a power and manual vehicle hydraulic brake system and equivalent remote control.

BACKGROUND ART

U.S. Pat. No. 4,121,874 discloses a power and manual hydraulic brake system for an airplane, along with antiskid control for the same. A relay valve and a shuttle valve coact with the pilot's manual master-cylinder to effect control of the power-assisted mode brake cylinder.

However, there is no isolation valve, as there is in the present invention. When the system of the patent is in the manual mode the passageway that connects from the manual master-cylinder to the power brake cylinder remains a part of the hydraulic system. Thus, actuation of the pilot's master-cylinder displaces fluid through that passageway and into the power brake cylinder to operate it, even though the power system is inoperative and no further functioning in that system takes place.

This displacement of fluid reduces the maximum hydraulic pressure obtainable during manual operation by about 25% to 33% in most installations of what it would be if the same system were wholly manual.

This is a very serious reduction of performance capability in the manual mode.

DISCLOSURE OF INVENTION

A power and manual mode wheel brake system, typically provided in duplicate for airplanes, to allow independent braking of the right and the left main landing wheels. A novel isolation valve is provided within each system, which valve fully hydraulically isolates the manual part of the system from the power part of the system when only the manual part is in operation.

Previously, the plumbing associated with the power brake cylinder has not been isolated from the manual system. The power brake cylinder has therefore been actuated, although without effect, causing a significant loss of displacement and pressure for the manual operation of the brakes. This loss has invariably resulted in sub-marginal braking performance in the manual mode.

The novel isolation valve, common to both the power and manual braking systems, retains full manual braking performance.

BEST MODE FOR CARRYING OUT THE INVENTION

Figure 1:
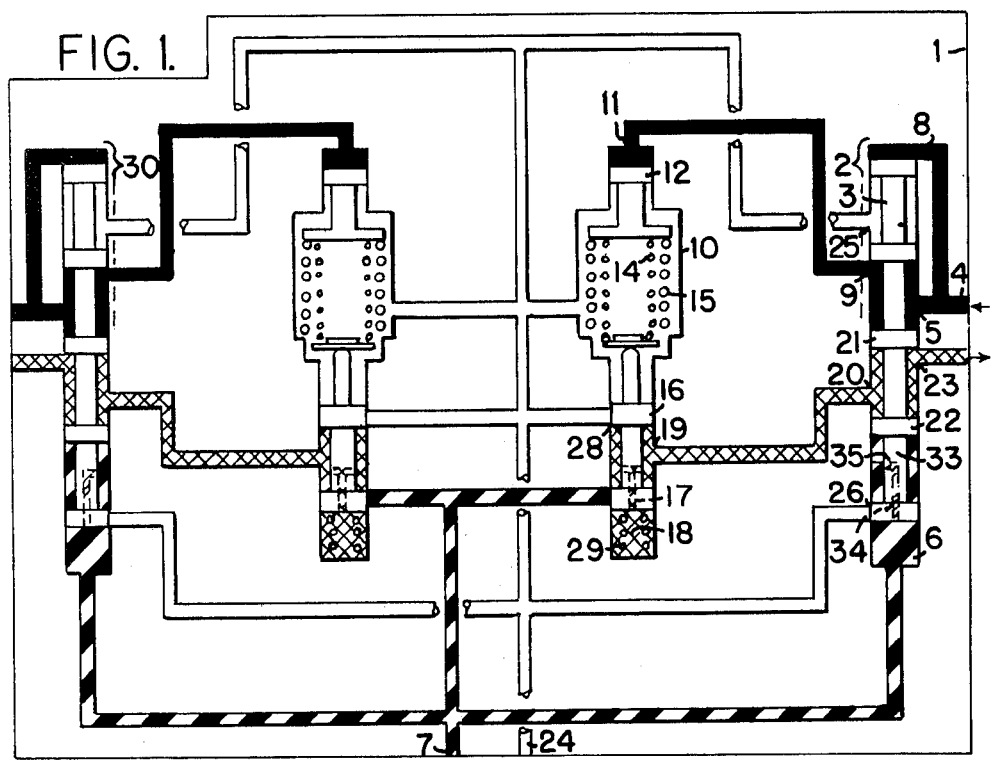
FIG. 1 is a schematic representation of the dual power and manual mode brake system, shown in the power mode.

In FIG. 1 the large rectangle identified by numeral 1 represents the valve control portion of a dual mode control system, typically duplicated for right and left wheels of an airplane, and shown in the power operating mode.

Elongated vertical element 2 is the right wheel isolation valve. It is detailed in the upper half of FIG. 3. Piston 3 extends nearly the entire length of the valve. In FIG. 1 it is shown in the upper, power mode, position.

Tubing 4 connects to the isolation valve at port 5 and elsewhere to the right master-cylinder of the manual mode part of the system. The master-cylinder is operated directly by the pilot of the airplane by depressing the right brake pedal with his foot. This structure is conventional and so has not been shown.

In FIG. 1, tubing carrying master-cylinder hydraulic pressure is identified by a black legend. Tubing carrying power brake pressure, to operate wheel brake cylinders in the power mode, is identified by cross-hatching. Tubing carrying system hydraulic pressure, provided by a power-driven pump, is identified by oblique stripes. Tubing carrying return hydraulic fluid to a reservoir is identified by the absence of any legend within the tubing.

Piston 3 is retained in the upward position shown by pressure exerted on the lower end thereof by system pressure in volume 6, which enters at tubing inlet 7 from the power-driven pump. This system pressure is typically within the range of 70 to 210 kilograms per square centimeter, ($kg/cm^2$), or 1,000 to 3,000 pounds per square inch (p.s.i.).

The power-driven pump may be of the gear or piston type, and either electrically or main-engine driven. A reservoir, an accumulator, and a check valve directed to maintain pressure if the pump is inoperative, are also preferably part of the pump system. This structure is conventional and so has not been shown.

Manual pressure also enters isolation valve 2 at upper port 8, but is overcome insofar as translating piston 3 by the considerably greater power system pressure at volume 6. Manual pressure entering port 5 passes on through exit port 9 to right brake power valve 10 at port 11 thereof.

Here the master-cylinder pressure acts upon piston 12 and compresses springs 14 and 15. The extent of travel of piston 12 downward depends upon the force exerted by the pilot on the brake pedal.

Spring 14 is relatively weak, typically having a compressive force of 25.7 kilograms per centimeter of compression, (kg/cm). It bears upon piston 16.

This establishes a fluid pressure in bottom cavity 18 that is the power brake pressure and is proportional to the manual force exerted by the pilot; although usually from 50% to 200% greater than the pressure he exerts at port 5. This gives the force magnification characteristic of power brakes. The hydraulic pressure available at inlet 7 is, of course, greater than any required brake pressure at the wheels.

Spring 15, by hydraulic pressure transmission, provides a resisting force on the brake pedal to give the pilot the characteristic "feel" in manipulating the brake. Typically, spring 15 may have a compressive force of 55 kg/cm.

The fluid under pressure in cavity 18 and adjacent volumes exits at port 19 of the power brake valve and enters port 20 of the isolation valve, in a separate volume contained between piston sections 21 and 22. Exit port 23 therefrom provides a path to the brake cylinder at the right wheel. The cylinder and wheel are conventional, and so have not been shown.

Passageway 24 provides a return for hydraulic fluid to the reservoir from port 28 at such time as hydraulic pressure is to be reduced, as when the pilot removes his foot from the brake pedal.

Further in FIG. 1, the left wheel braking system is identified by isolation valve 30. This system has all the elements of, and is a mirror image of, the right wheel braking system that has been described. It operates in the same way as before in response to depression of the left brake pedal by the pilot.

Figure 2:
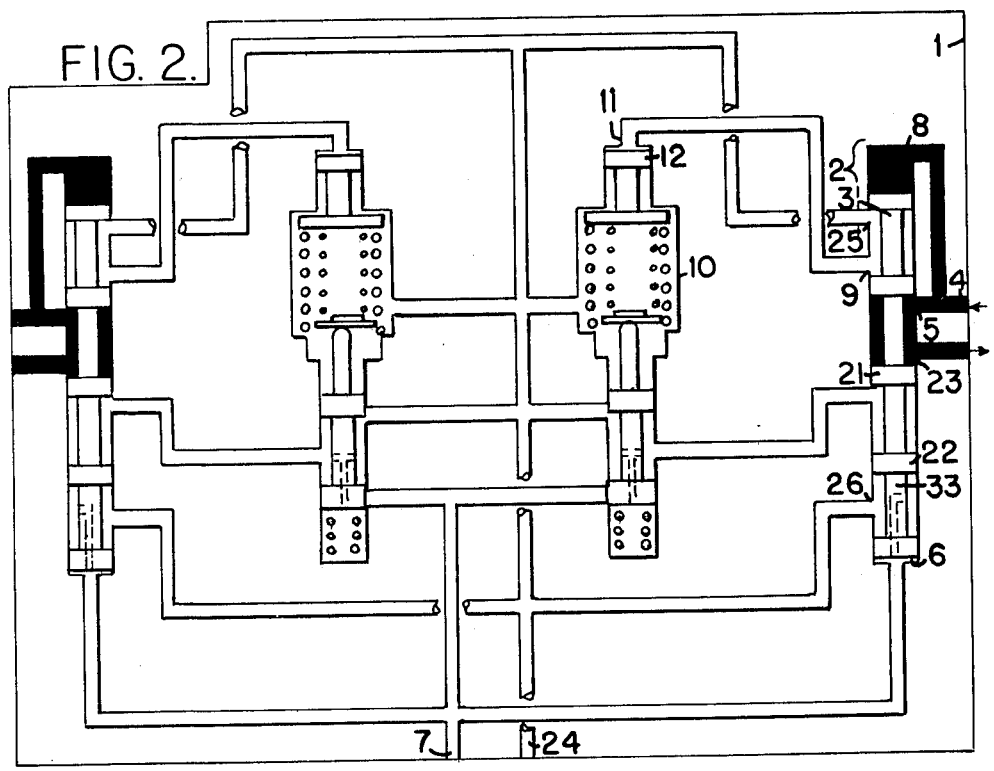
FIG. 2 is the same, but shown in the manual mode.

FIG. 2 shows the same system as that of FIG. 1, save that the showing is for the manual mode according to this invention.

The manual mode occurs automatically in the system when the system pressure (oblique stripes) drops below the master-cylinder pressure (black) that is exerted by the pilot. Such a power mode pressure drop may occur because of a serious leak, or non-operation of the pump.

For an example the system pressure for the power mode is taken as zero. Thus, the pressure of the fluid at inlet 7 is zero, and although there is fluid in this passageway it is impotent to effect braking.

Notwithstanding, pressure exerted by the pilot by means of the master cylinder causes this pressure to occur at passageway 4 and port 5, as before. However, there is now no pressure at volume 6, and so the master-cylinder pressure, also present at upper port 8, translates piston 3 downward sufficiently far to close port 9 from port 5 and connects port 9 to return port 25. This prevents displacement of the fluid from the master cylinder into the passageway between ports 9 and 11 and further displacement in pushing piston 12 downward, as before.

This displacement, if allowed, would result in approximately a 25% to 33% loss in most installations of manual braking capability over that of an equivalent all-manual system. This is a loss that cannot be tolerated, but has been accepted as unavoidable when manual braking is resorted to in a power-to-manual dual system of the prior art.

In the system of the present invention, in the manual mode the fluid pressure exerted by the master-cylinder proceeds directly to the brake cylinder at the wheel via exit port 23. Thus, the above-mentioned loss does not occur.

Figure 3:
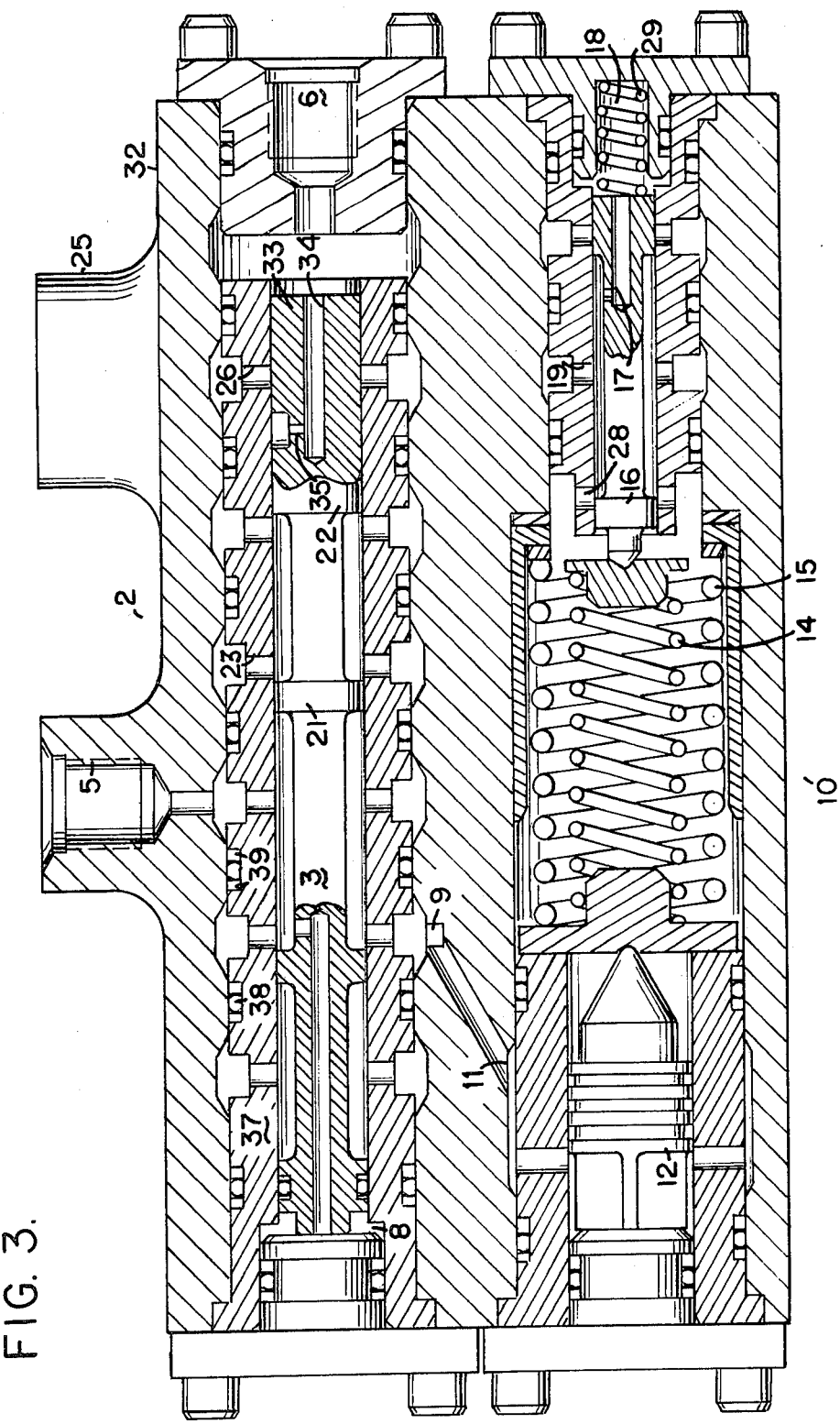
FIG. 3 is a cross-section of the isolation valve and the companion power brake valve for operating one side of the left and right brake system of FIGS. 1 and 2.

Isolation valve 2 and companion power brake valve 10 are detailed in FIG. 3. The same identifying numerals as used in FIG. 1 apply.

The valve structure is preferably mounted horizontally to facilitate bleeding air from the system, and are so shown in FIG. 3.

The companion valves are disposed in one housing 32. This may be a suitable aluminum alloy for machining from bar stock, for forging, or for casting, whichever is desired for manufacturing. The upper mechanism is isolation valve 2 and the lower mechanism is power brake valve 10.

In the isolation valve, port 23 coacts with the piston section between 21 and 22, as before. Piston section 3 acts in general as before, but as a part of this invention has an axial bore 34 through which power brake system pressure enters from volume 6. Minor bore 35, transversely connected to bore 34, acts as a restrictor. It has a preferred diameter of approximately 1 millimeter (mm).

The restrictor bleeds away any residual system pressure through port 26 when the shift is to the manual mode. This insures that isolation valve 2 remains in the manual mode during brake applications until the system pressure returns to its normal operating value. The restrictor causes system pressure to increase in volume 6 under normal operation of the pump. Isolation valve 2 thus returns to the power mode by piston 3 moving to the left in FIG. 3.

When the pilot removes foot pressure, piston 16 of power brake valve 10 is no longer pressured by spring 14 and so is caused to move to the left in FIG. 3. This vents the power brake pressure to system return port at 28 to substantially zero pressure.

Compression spring 29 is housed within cavity 18 and provides a positive return force upon piston 16 to insure that the brake will be in the off position and thus ready for the next application of foot pressure by the pilot. Spring 29 may have a compression force of 6.25 kg/cm.

One system, instead of the dual right and left, can be utilized for another type of vehicle, such as an automobile truck, or a rail vehicle.

Also, a system can be utilized for remote control of mechanisms that are normally power actuated, but have the manual control option that takes control if the power system becomes inoperative.

In FIG. 3 a stainless steel sleeve 37 preferably surrounds piston 3, which may be of the same material. Known elastomer "O" rings 38 and backup rings 39 are used to seal the sleeve to housing 32.

Required passageways are shown in FIGS. 1 and 2. Certain of these passageways are not shown in FIG. 3 because of the single section thereof.

I claim:

1. The method of selectively operating a power or manually operable hydraulic brake system, that comprises the method steps of;
   (a) power operating said brake system when power pressure is exerted,
   (b) manually operating said brake system when said power pressure is not exerted,
   (c) isolating the power portion of said brake system from the manual portion of said brake system by pressure from said manual portion of said brake system moving a piston to close a port (9) to the power portion of said brake system when said brake system is manually operated,
   (d) connecting the closed port (9) to the power portion of said brake system instead to a vent port (25) of said brake system to vent residual pressure therefrom by the same motion of said piston, and
   (e) venting residual system pressure by opening another vent port (26) by the same motion of said piston.

2. A hydraulic vehicle brake system selectively power or manually operable, comprising;
   (a) power pressure means (10) to apply hydraulic fluid pressure to at least one vehicle brake of said system,
   (b) manual pressure means (5,23) to apply hydraulic fluid pressure to at least the said one vehicle brake in the absence of pressure from said power pressure means,
   (c) an isolation valve (2) actuable by hydraulic fluid pressure from said manual pressure means to isolate the same from said power pressure means in the absence of pressure from said power pressure means,
   (d) said isolation valve comprised of;
      (1.) a valve body (32),
      (2.) a translatable piston (3) within said valve body, and
      (3.) at least one port (9) within said body hydraulically connected to said power pressure means, disposed in said valve body to be closed by translation of said piston upon manually produced pressure being exerted upon said piston in the absence of system (7) pressure, so that the full volume of hydraulic fluid and the full pressure thereon produced by said manual pressure means is exclusively applied to at least said one vehicle brake, and (e) a restrictor passage (34,35) in said piston (3) leading from a system pressure volume (6) to a pressure vent port (26), to reduce residual system pressure in said system pressure volume (6).

3. The brake system of claim 2, in which;

(a) manual pressure is exclusively applied to at least the said one vehicle brake when the system (7) pressure that produces pressure in said power pressure means (6) is appreciably less than that from said manual pressure means (4,8).

4. The brake system of claim 2, in which;

(a) said isolation valve (2), when actuated by said manual pressure means (4), prevents the actuation of said power pressure means (10) in the absence of pressure from said power pressure means, to prevent the diversion of a portion of the hydraulic fluid displacement (9,11,12) that is produced by acutation of said manual pressure means.

* * * * *